G. A. TINNERMAN.
COMBINED GAS AND SOLID FUEL RANGE.
APPLICATION FILED FEB. 23, 1910.
1,255,353.
Patented Feb. 5, 1918.
3 SHEETS—SHEET 1.
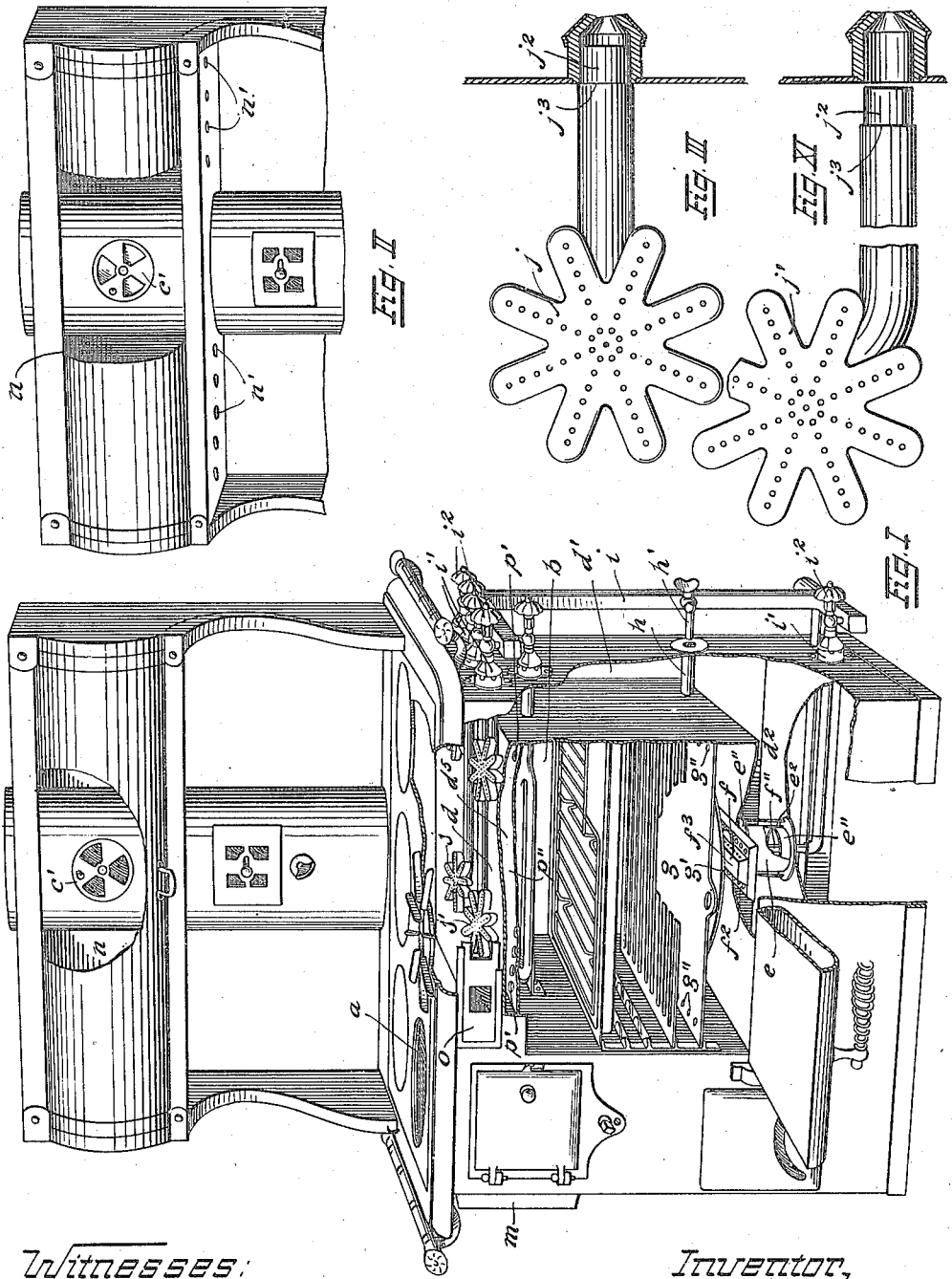
Witnesses:
F. C. Valentine
H. H. Belknap
Inventor,
George A. Tinnerman,
by
his attorney.

G. A. TINNERMAN.
COMBINED GAS AND SOLID FUEL RANGE.
APPLICATION FILED FEB. 23, 1910.
1,255,353.
Patented Feb. 5, 1918.
3 SHEETS—SHEET 2.
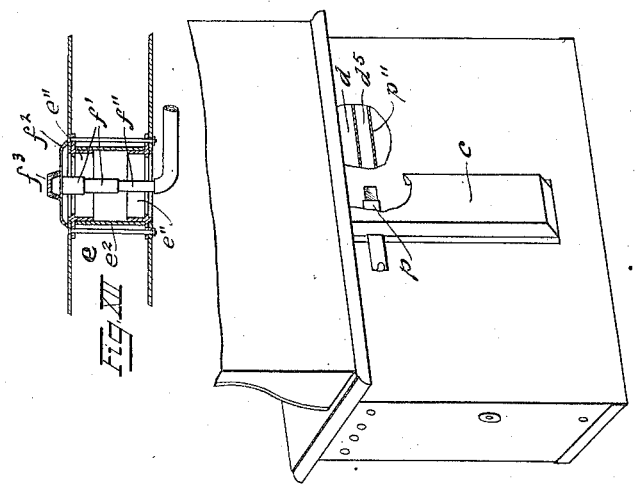
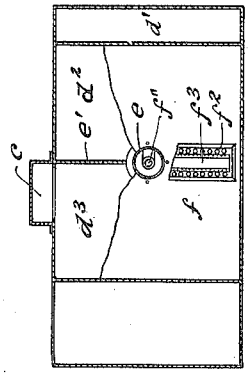
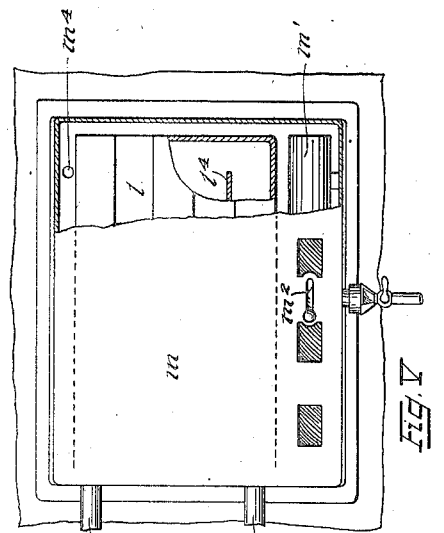
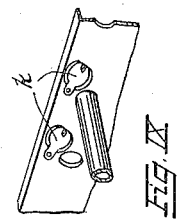
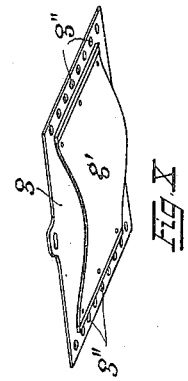
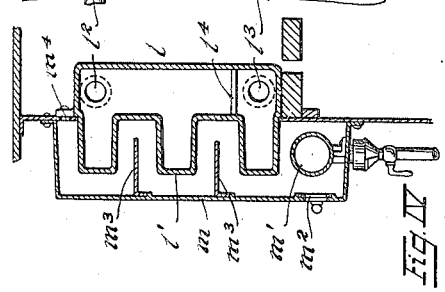
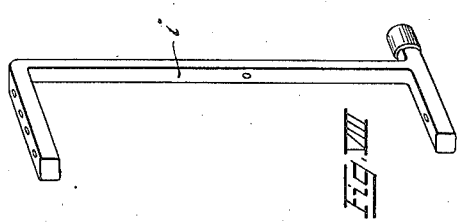
Witnesses:
Inventor:
George A. Tinnerman,
his attorney.

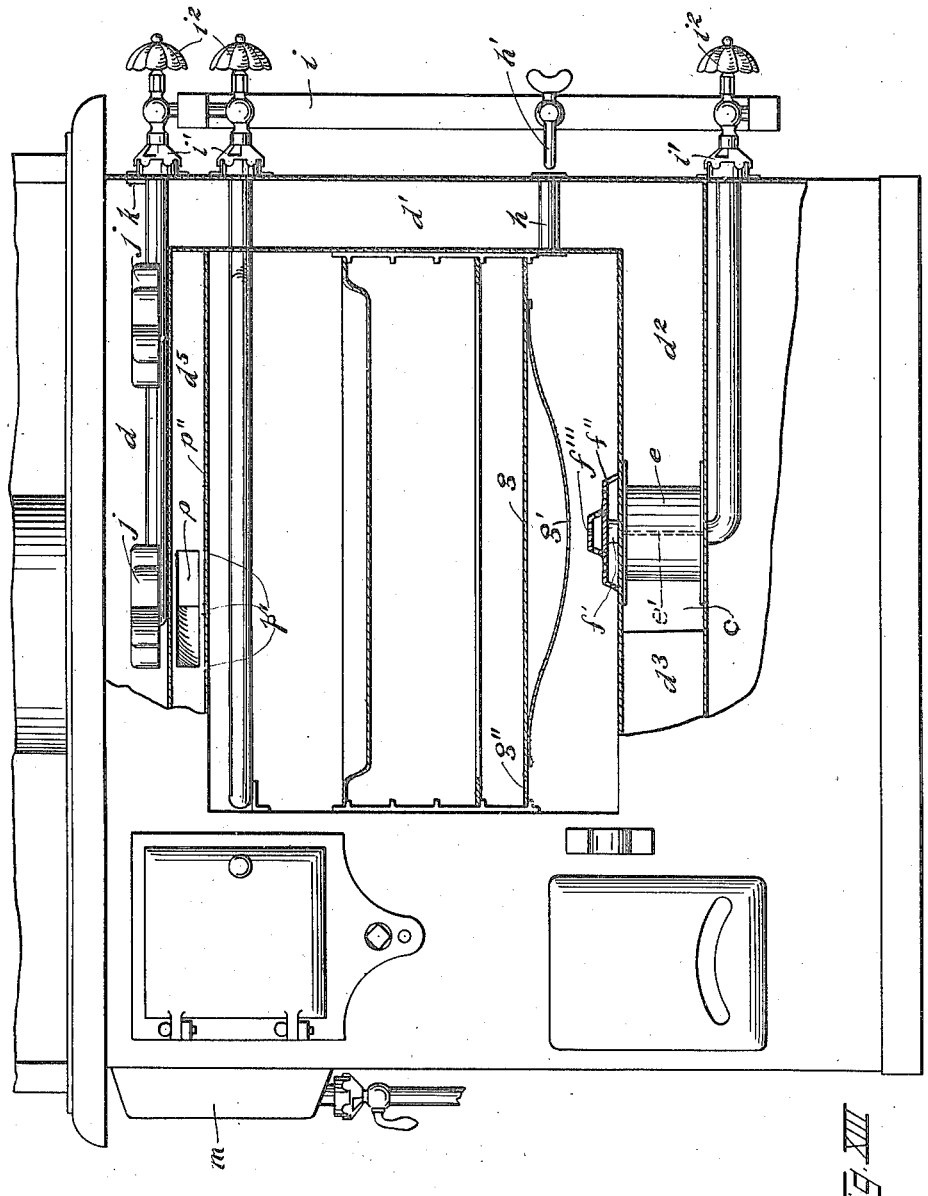

UNITED STATES PATENT OFFICE.

GEORGE A. TINNERMAN, OF CLEVELAND, OHIO.

COMBINED GAS AND SOLID-FUEL RANGE.

1,255,353.  Specification of Letters Patent.  Patented Feb. 5, 1918.

Application filed February 23, 1910. Serial No. 545,347.

*To all whom it may concern:*

Be it known that I, GEORGE A. TINNERMAN, a citizen of the United States of America, and a resident of Cleveland, in the Cuyahoga and State of Ohio, have invented certain new and useful Improvements in Combined Gas and Solid-Fuel Ranges, of which the following is a specification.

My invention relates to improvements in combined gas and solid fuel ranges, and has for its object the improvement of such ranges, particularly with regard to the gas-burning and heating portion thereof, as will appear much more in detail upon referring to the accompanying specification, drawings and claims.

For the purpose of adapting a range alternatively to be used either with coal or gas, I have provided the same with permanently mounted gas connections and mixers, preferably positioned at one end of the range and therefore out of the way of the user of said range. In association with the gas connections and mixers, are provided readily insertible and removable burners, which extend into the proper positions beneath the stove lids.

For the purpose of making all the gas connections of the range and avoiding pipe fitting, I have further provided at the gas-connecting end of the range, a gas "manifold," from which all of the gas connections are made, thus insuring accuracy, interchangeability, and cheapness of construction.

In addition to the mixers for the top burners, there are connected with said manifold, a bottom or oven burner, whose connection is briught into the range in a peculiar and advantageous manner, a pilot burner for conveniently lighting said oven burner from the exterior of the range, and a water-heater-burner. The oven burner is removably positioned in the bottom of said oven, and has a tubular inlet provided with a rearward partition, which serves to direct the products of combustion from the coal range around an beneath the bottom of the oven, while a convertible slide is removable from the oven when it is to be heated by coal.

Associated with the oven, and preferably with the burner as well, is a novel air-distributer. However, the features of the burner and unitary air-distributer *per se*, are claimed in my Letters Patent No. 1,062,670, May 27, 1913, as dissociated from the oven, with its restricted air-duct.

The range, moreover, is equipped with front and back ventilating slides for securing ventilation directly to the chimney pipe when the gas burners are in use, and suitable closures for covering the air mixers are provided when the gas burners are removed.

The warming closet, situated above the range, serves as an odor-hood; the bottom of said closet being perforated and a vent and closure being provided within said closet, establishing communication with the chimney pipe.

Associated with the fire box of the coal grate, there is provided a water front at the end of the range opposite the principal gas connections; the said water front forming one wall of the fire box, and being equipped with a gas burner positioned adjacent to the lower portion of said water front exteriorly of the fire box. The water connection for said water front is adjacent to said gas burner, and baffle plates are provided for securing the maximum heating effect from the gas burner, and for insuring initial heating of the cold water as it enters said water front.

The details of these, together with other features, are set forth in the accompanying description and drawings; the latter comprising:—

Figure I, which illustrates in perspective, partially broken away, a combined coal and gas range, equipped in accordance with my invention.

Fig. II is a detail of the odor-hood, warming closet and associated chimney pipe.

Fig. III is an enlarged plan view showing one of the removable gas burners.

Fig. IV is a vertical sectional view, and

Fig. V is a side elevation partially broken away, illustrating my improved water front.

Fig. VI is a rear view of the range in perspective partially broken away omitting the manifold and gas connections.

Fig. VII is a horizontal sectional view partially broken away, illustrating the connection of the coal range to the chimney pipe.

Fig. VIII is a perspective view of the integral gas manifold.

Fig. IX is a detail showing the closures for the gas burner openings, with a section of one of the attached pipes inserted.

Fig. X is an under-side view in perspective illustrating the convertible oven-slide.

Fig. XI is a plan view of one of the gooseneck removable gas burners.

Fig. XII is a detail sectional view illustrating the tubular inlet for the oven burner, and Fig. XIII is a composite view upon an enlarged scale showing the lower portion of my improved range, partly in front elevation and partly in vertical section.

Throughout the several figures of the drawings, I have employed the same character of reference to indicate similar parts.

In the combined gas and coal range of my invention, the fire box $a$ is positioned upon the left, the outer side of which comprises the water front, which I shall presently describe. The oven $b$ is positioned adjacent to one side of and below the fire box, and affords inner walls for the down-draft flues surrounding said oven upon three sides. The chimney pipe $c$ is connected with said flues $d$, $d'$, $d^2$, $d^3$ at the back and a little to the left of the center of the range beneath the oven $b$.

In order to secure more effective circulation of the products of combustion and assist as well, in providing for a gas burning range, I have provided a tubular receptacle $e$ for the oven pipe $f''$, which incloses said pipe and its gas connection $f'$ within the space of the bottom flue $d^2$, and a partition wall $e'$ extends from said part rearwardly to the back of the range, in order to insure the circulation of the products of combustion.

The oven burner $f$ is shown in position at the bottom of the oven (Figs. I and VII), extending transversely thereof, and the same comprises a longitudinal air-distributer $f^2$ communicating with the receptacle and inlet $e$, and a superposed gas burner $f^3$; both of which are perforated with numerous holes or openings. The air-distributer primarily is provided to support combustion along the oven burner when the oven is closed, but broadly considered, said member with its restricted air-duct, may serve to supply air throughout the oven for limited ventilation, equalizing the heat, or other purposes. Connection $f'$ fits removably upon the pipe $f''$, which is led up through the flues beneath the oven within said inlet $e$; the latter comprises upper and lower collars $e''$, and a connecting sleeve or tube $e^2$ secured together by bolts. Within the oven and above said burner there is provided a removable converticle slide $g$ (Fig. X), which has a deflecting plate $g'$ for directing the heat from the burner to either side of the oven, through openings $g''$.

Tube $h$, extending through the flue $d'$ and exteriorly connecting the bottom of the oven with the gas igniter $h'$, affords the simplest means for lighting the oven burner $f$ from the exterior without danger to the user. By lighting the gas at igniter $h'$, the flame will be directed through tube $h$ into the oven, whereupon the gas issuing from the oven burner will instantly be ignited. All of the gas connections, as shown in Fig. I, are made from a single cast manifold $i$ (Fig. VIII), which affords the simplest, cheapest and most accurate means of providing the relatively large number of gas connections required. The several mixers $i'$ are secured to the end of the range, and the valves $i^2$ are tapped directly into the manifold in the proper positions, thereby avoiding all pipe fitting and chance for leakage.

The removable burners $j$ $j'$ (Figs. III and XI) are similar in construction, except that the latter have longer connecting pipes of the goose-neck pattern, in order to position the burners beneath the stove openings at a distance from the mixers. Each type of removable burner is provided with a thimble $j^2$ fitting readily within the mixer, and a shoulder $j^3$ regulating the distance that the thimble is inserted within the mixer. From the above, it will be seen that the burners $j$ $j'$ may be inserted within their respective mixer openings, or removed from the passage or flue $d$, at a moment's notice, thereby adapting the range either for the use of gas or fuel. As shown in the fragmentary view (Fig. IX), the mixer openings are provided with pivoted closures $k$ adapted to cover said openings, while the range is heated with coal or similar fuel.

In the enlarged views (Figs. IV and V) are shown details of the water front which comprises a casting $l$ extending partly within the fire box and having an outer corrugated side wall $l'$. Water inlet and outlet pipes $l^3$ $l^2$ are provided for said water front, which connect with the supply system and the tank, not shown. A baffle plate $l^4$ extends transversely within the water front nearly its entire length, thereby subjecting the cold water, as it enters the device, to the highest temperature. An outer casing $m$ incloses the corrugated side wall $l'$ of said water front; in the lower portion of which is a longitudinal gas burner $m'$ and an adjustable slide $m^2$. Baffle plates or projections $m^3$ extend within the recesses of the corrugated side wall $l'$, in order to increase the heating effect of the gas burner. Vents $m^4$ communicate with the interior of the range, and the adjustable slide $m^2$ is either closed while the range is heated with coal, or is partially opened during the heating with gas, to regulate the air supply within the casing $m$.

Inclosing the upper portion of the chimney pipe is the warming oven $n$, which serves as well as an odor hood, the bottom thereof being provided with numerous openings $n'$ positioned above the top of the range. A rotatable closure $c'$ in the chimney pipe, permits the desired amount of ventilation to be had from the top of the range and warming oven $n$, so that steam and odors may be drawn up the chimney, when desired.

An adjustable slide $o$ is provided immediately above the oven opening at the front of the range, opening upon the transverse flue $d$; this slide being closed during the use of the range with coal, but being opened, as required, when the gas burners are in use. Similarly, a corresponding slide $p$ at the rear of the range is adapted to be closed or opened, in order to permit the connection of the flue $d^5$ directly with the chimney pipe under the latter condition of use. The purpose thereof is to secure an equalized heating of the oven by the gas burner, and connect said oven with the chimney pipe while said burner is in use. Referring to Fig. I, it will be seen that a series of openings $p'$ occur in the false top $p''$ of said oven, which openings connect with the flue space $d^5$. Thus, the heat from the oven burner is directed laterally through the side openings $g''$, and then forwardly through said openings $p'$, finally reaching the chimney pipe through the opening controlled by slide $p$.

An important consideration when the range is used with coal, or other solid fuel, is the uniform heating of the oven-bottom from beneath. This cannot occur in a construction employing a large air-duct, or a number of ducts, which not only remain cold but obstruct the bottom flue. Such ducts also afford access for an undesirable influx of cold air to the oven, and accordingly I employ in connection with an air-duct of relatively small size, my novel air-distributer, intimately associated with the burner to produce the most effective combustion immediately above the oven bottom, rather than below it. The elongated burner also effects an even distribution of heat, particularly in association with the agencies set forth.

From the foregoing, it will be appreciated that numerous features of advantage are present in my improved range, as compared with those previously in use; the principal features being alluded to in the opening portions of my specification. Inasmuch as the gas burners are so easily and quickly removable, it is apparent that the change may be made from gas to solid fuel heating with the expenditure of the least time and trouble on the part of the user. Moreover, these burners are not in the way, nor are they subject to deterioration during the use of coal or similar fuel.

Having now described the preferred embodiment of my invention, I claim as new, and desire to secure by Letters Patent, the following:—

1. In a combined gas and solid fuel range, the combination with a fire box, of an oven, inclosing spaced flue-walls from which the oven may be heated, an elongated removable gas burner positioned above the bottom of the oven by which it may also be heated, a gas-connection, a restricted air-duct positioned beneath and of materially less area than the burner, the same extending through the spaced flue-walls, and associated means for distributing air to the oven and adjacent to the extremities of the elongated burner, substantially as set forth.

2. The combination with a range, of a normally closed oven therefor, spaced bottom flue walls beneath said oven, an air-duct extending through the flue-walls to the oven, and an air-spreader positioned upon the oven bottom connecting with, but extending at a distance beyond the air-duct, substantially as set forth.

3. In a combined gas and solid fuel range, the combination with a fire box, of an oven, inclosing spaced flue-walls from which the oven may be heated by solid fuel, an elongated removable gas burner positioned above the bottom of the oven by which it may alternatively be heated, an air spreader associated with and substantially co-extensive with said elongated burner, a gas-connection, and a restricted air-duct, respectively extending through the spaced flue-walls to the oven and connecting with the burner and air-spreader, whereby combustion is facilitated in the closed oven; said air-duct being of materially less area than the burner and air-spreader to avoid obstruction in the inclosing flue, substantially as set forth.

4. In a combined gas and coal range, the combination with a fire box, of an interior oven adapted to be heated thereby, flue walls surrounding the oven, a gas burner within said oven, a tube extending between the flue walls approximately in the plane of said oven burner, and substantially flush with the outer and inner flue walls respectively, and a lighting burner exteriorly positioned before the mouth of the tube, substantially as set forth.

5. In a range of the class described, the combination with an oven, of an elongated burner positioned adjacent to the bottom of the oven, a deflecting plate above the same having inclined surfaces and lateral openings, a flue at the top of the oven having front openings, and an adjustable slide at the rear of the flue controlling the opening to the chimney-pipe, substantially as set forth.

6. In a range of the class described, the combination with a convertible oven and its gas connection, of an elongated burner member removably fitting thereon, an air spreader extending beneath said burner, bottom flue-walls beneath said oven, and a collar spaced apart from the gas connection and connecting with the air spreader to form a conduit to distribute the external air peripherally of the burner member, substantially as set forth.

7. In a range of the class described, the combination with a single restricted air duct to the external air, of a gas connection, a convertible oven to which said duct and gas connection lead, bottom flue-walls beneath said oven, and a removable member comprising an air spreader and an elongated burner-member superposed thereon, the same extending at a distance from, and being respectively adapted for connection with said air duct and gas connection, substantially as set forth.

8. In a range of the class described, the combination with the normally closed convertible oven thereof, of a removable elongated oven burner, a connecting gas pipe, an air spreader extending substantially the length of the burner and having perforations or openings for distributing air peripherally thereto, said burner and spreader being removably positioned just above the oven-bottom, bottom flue-walls, and a restricted air-duct extending therethrough registering with a small section of, and adapted to supply air to said spreader, substantially as set forth.

In testimony whereof I affix my signature in presence of two witnesses.

GEORGE A. TINNERMAN.

Witnesses:
FRANK H. FORREST,
A. H. TINNERMAN.